# UNITED STATES PATENT OFFICE.

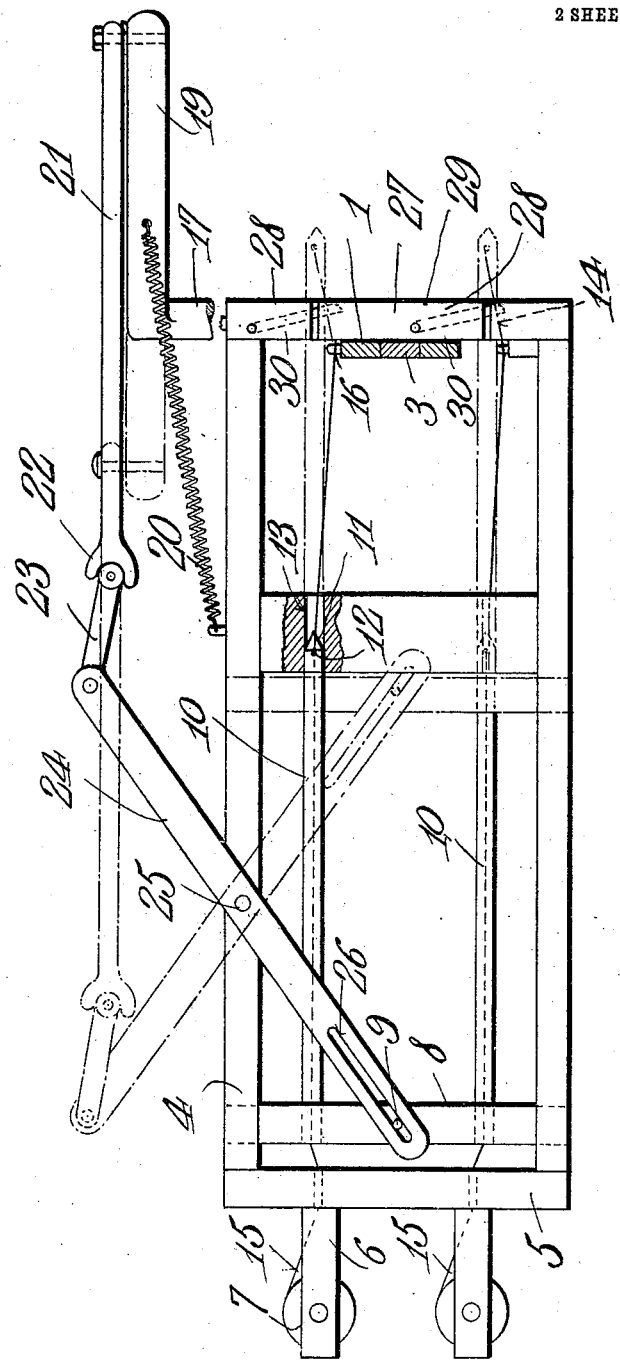

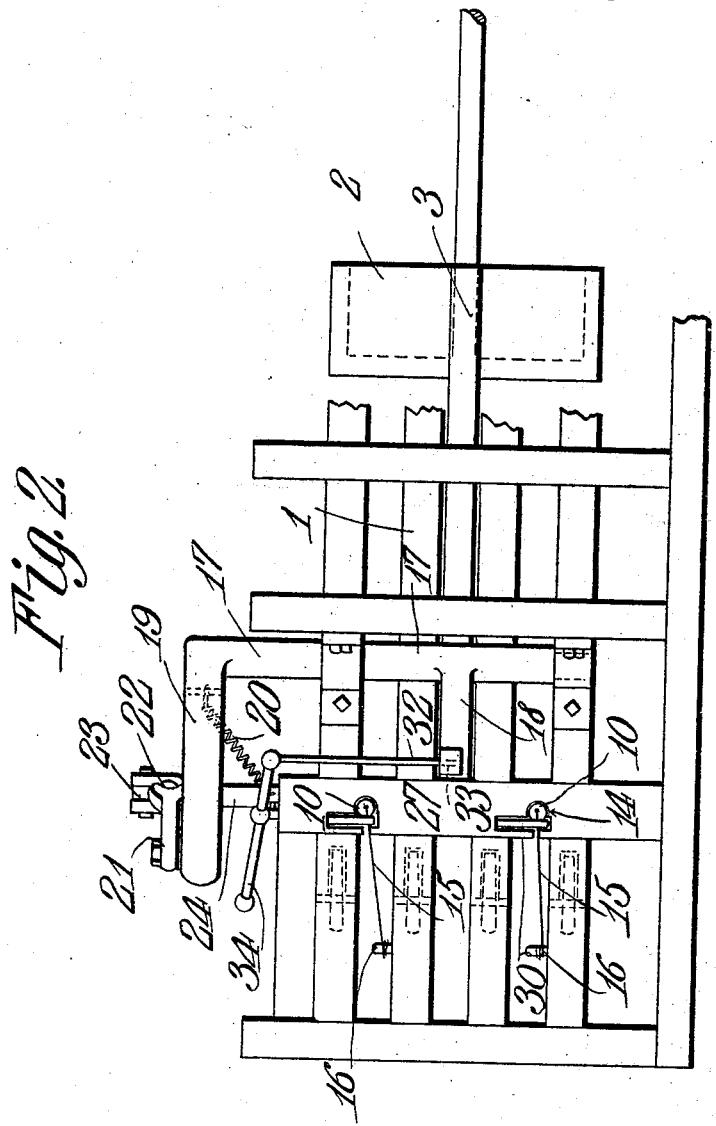

JOHN H. SAWYER, OF LEXINGTON, KENTUCKY, ASSIGNOR OF ONE-HALF TO JOHN N. MARLSEY, OF LEXINGTON, KENTUCKY.

BALE-WIRING MECHANISM.

940,897.  Specification of Letters Patent.  Patented Nov. 23, 1909.

Application filed May 26, 1909. Serial No. 498,396.

*To all whom it may concern:*

Be it known that I, JOHN H. SAWYER, a citizen of the United States, residing at Lexington, in the county of Fayette and State of Kentucky, have invented a new and useful Bale-Wiring Mechanism, of which the following is a specification.

This invention has relation to bale-wiring mechanisms adapted to be used in conjunction with baling presses and it consists in the novel construction and arrangement of its parts, as hereinafter shown and described.

The object of the invention is to provide a wiring mechanism of the character indicated which is adapted to be operated, in part, by the reciprocating plunger of a baling press or parts attached thereto, and the completion of its operation is effected through the instrumentality of traction springs operatively connected with the wiring mechanism and the body of the baling press.

A further object of the invention is to provide a simple mechanism of the character indicated which is adapted to carry the wire across the end of the bale, means being provided for holding the wire while it may be cut and its adjacent ends twisted together or otherwise secured.

In the accompanying drawings:—Figure 1 is a side elevation of the bale-wiring mechanism, showing the same applied to a baling press, which press is shown in cross section. Fig. 2 is a side elevation of a portion of the press, showing the wiring mechanism applied thereto.

As shown in the drawings, 1 indicates the box of an ordinary baling press, and 2 a plunger such as is generally used in presses of the reciprocatory pattern. A bar 3 is attached to one side of the plunger and is adapted to move between the side-bars of the bale box 1. Guides 4 are transversely disposed with relation to the bale box and project beyond one side of the same and at their outer ends are connected together by an upright 5. Arms 6 are supported by the upright 5, and upon the said arms are journaled spools 7. A needle-bar 8 is slidably mounted between the guides 4 and is provided upon one side with an outstanding pin 9. Needles 10 are attached at their outer ends to the needle-bar 8, and at their opposite ends are pointed as at 11 and provided with eyes 12. The inner end portions of the needles 10 are adapted to move through openings 13 and 14, provided in the upright, forming component parts of the baling box 1. Wire strands 15 are wound upon the spools 7 and are carried forward and pass through the eyes 12 of the needles 10. Hooks or pins 16 are mounted upon the side bars of the baling box. A vertically disposed shaft 17 is journaled for rotation at that side of the baling box 1 opposite the side thereof beyond which the guides 4 project, and the said shaft 17 is provided at a point intermediate of its ends with a laterally disposed tappet 18, which, at times, is adapted to project into the path of movement of the bar 3, carried by the plunger 2.

At its upper end the shaft 17 is provided with a laterally disposed arm 19. A coil spring 20 is fixed at one end to the top of the baling box 1, and at its other end to the arm 19. The said spring 20 is under tension with a tendency to hold the free end portion of the arm 19 toward or over the top of the baling box 1. A pitman 21 is pivotally attached at one end to the outer extremity of the arm 19, and at its other end is connected by means of a universal joint 22 with a link 23. The said link, in turn, is connected at that end opposite the end thereof which is connected with the pitman 21 with the power end of a lever 24. The said lever 24 is fulcrumed at the point 25 to the uppermost guide 4. At its working end the lever 24 is provided with an elongated slot 26 which receives the pin 9 mounted upon the needle-bar 8. The upright 27 is that above referred to as possessing the openings 14, and in addition to the said openings the said upright 27 is provided upon its outer side with recesses 28, which, in turn, are bounded upon their outer sides and at their upper edges by the downwardly extending flanges 29, which transform the said recesses into downwardly and outwardly disposed pockets. Catch-bars 30 are pivotally attached at their upper ends in the upper portions of the said pockets or recesses 28 and normally lie in inclined positions therein, and the lower end portions of the said catch-bars 30 are in the paths of movement of the pointed ends 11 of the needles 10.

The operation of the bale-wiring mechanism is as follows: Presuming that the needles 10 are in retracted position, as illustrated in heavy lines in Fig. 1, the wire strands 15 are unreeled from the spools 7 and threaded through the eyes 11 of the said needles and carried across the baling box 1 and passed around the outer edges of the catch-bars 30 and looped around the hooks or pins 16. Hay is then fed into the baling box 1, and as the plunger 2 reciprocates the bar 3 carried by the same engages the side of the tappet 18 and moves the same about the axis of the shaft 17 and turns the said shaft. When the tappet 18 is carried between the side bars of the baling box 1 a rod 32 descends and engages a depression 33, provided in the upper side of the said tappet and holds the tappet and the shaft 17 against movement, in response to the spring 20. A lever 34 is fulcrumed at the upper end of the upright 27 and is operatively connected with the rod 32. As the formation of the bale advances or progresses the wires 15 which have previously been carried across the baling-box 1, are bowed longitudinally along the bale, and when the bale arrives at completion an operator depresses the lever 34, which movement on the part of the said lever elevates the rod 32 above the upper edge of the depression 33 in the tappet 18. Consequently, when the plunger 2 and the bar 3 move away from the shaft 17, the said shaft is free to turn under the tension of the spring 20, and as the arm 19 is swung around the axis of the shaft 17, the pitman 21 is moved longitudinally, as is also the link 23, and the lever 24 is swung upon the fulcrum 25, and, through the engagement between the said lever 25 and the needle-bar 8, the needles 10 are moved longitudinally across the baling-box 1 and behind the completed bale. When the pointed ends of the needles engage the catch-bars 30 the lower ends of the said bars are swung up, and after the wire 15 passes under the said bars, the said bars fall into their normal inclined positions, as indicated in Fig. 1 of the drawings. When in such positions an operator cuts the wire in the vicinity of the eyes of the needles and removes the looped ends of the wires from the pins or hooks 16, and the adjacent ends of the wires are then twisted together. That end of the wire which still remains in the eyes of the needles is then paid out and provided with a loop, which loop is caught over the pin 16 when the needles are permitted to move to their normal positions, which is caused by the advancement of the plunger 2 and the bar 3 which engages the tappet 18 and swings the same and turns the shaft 17 against the tension of the spring 20.

Thus it will be seen that a simple and an effective attachment for a baling press is provided which attachment is especially adapted to wire the bale without the use of blocks or other mechanism unattached to the baling-press.

Having described my invention, what I claim as new and desire to secure, by Letters Patent, is:—

1. In combination with a baling-box having a reciprocating plunger a bale-wiring mechanism comprising means for securing the wire, a needle mounted for movement transversely of the baling-box, said needle having a pointed end and an eye in the vicinity thereof through which the wire is threaded, a reel carrying the wire, means for projecting the needle transversely across the baling box upon the retreat of the plunger, and means for retracting the needle upon the advance of the plunger, and locking means for holding the needle in retracted position.

2. In combination with a baling box having a reciprocating plunger, a bale-wiring mechanism comprising a needle mounted for movement transversely across the plunger, a wire reel, a wire located upon the reel and passing through an eye provided at the pointed end of the needle, means for securing the end of the wire, a latch-bar pivotally mounted at the side of the baling-box and lying in the path of movement of the needle, and adapted to engage the wire and hold the same from moving into the baling-box with the needle, a shaft journaled upon the baling-box and having a laterally disposed tappet adapted at times to enter the path of movement of the reciprocating plunger, a locking means adapted to engage the tappet and prevent turning of the same about the axis of the shaft, a laterally disposed arm carried by the shaft, a spring attached at one end to said arm and at its other end to the baling-box and being under tension with a tendency to hold the arm over the baling-box, a pitman pivotally connected with the arm, a link connected by a universal joint with the pitman, a lever fulcrumed to guides attached to the baling-box, said lever being operatively connected with the link, a needle-bar slidably mounted between the guides and operatively connected with the working end of the said lever.

In testimony that I claim the foregoing as my own, I have hereto affixed my signature in the presence of two witnesses.

JOHN H. SAWYER.

Witnesses:
  HENRY BUSH,
  W. D. NICHOLAS.